(12) United States Patent
Akins et al.

(10) Patent No.: US 6,363,885 B1
(45) Date of Patent: Apr. 2, 2002

(54) LIVESTOCK FEEDER

(75) Inventors: Allan Akins, P.O. Box 158, St. Boniface, Manitoba (CA), R2H 3B4; Joe Kuffner; Len Peters, both of St. Boniface (CA)

(73) Assignee: Allan Akins, Manitoba (CA)

( * ) Notice: Subject to any disclaimer, the term of this patent is extended or adjusted under 35 U.S.C. 154(b) by 0 days.

(21) Appl. No.: 09/326,780

(22) Filed: Jun. 4, 1999

(30) Foreign Application Priority Data

Sep. 30, 1998 (CA) ............................................. 2249102

(51) Int. Cl.[7] ................................................. A01K 5/01
(52) U.S. Cl. ....................... 119/51.01; 119/61
(58) Field of Search ................ 119/51.01, 61, 119/62, 63, 900; D30/129, 130, 131

(56) References Cited

U.S. PATENT DOCUMENTS

| | | | | |
|---|---|---|---|---|
| 150,423 A | * | 5/1874 | Link et al. | |
| 1,012,589 A | * | 12/1911 | Blumberger | |
| 1,037,093 A | * | 8/1912 | Wendorf | |
| 1,159,190 A | * | 11/1915 | Derr | |
| 1,741,194 A | * | 12/1929 | Levine | |
| 2,550,215 A | * | 4/1951 | Beach | |
| 3,810,446 A | * | 5/1974 | Kightlinger et al. | 119/61 |
| 4,436,056 A | * | 3/1984 | Macleod | 119/72 |
| 4,440,111 A | * | 4/1984 | Meyer | 119/61 |
| 4,706,609 A | | 11/1987 | Delichte | |
| 5,005,524 A | * | 4/1991 | Berry | 119/51.11 |
| 5,069,166 A | * | 12/1991 | Ahuna | 119/61 |
| 5,105,769 A | * | 4/1992 | Smith et al. | 119/61 |
| D326,742 S | * | 6/1992 | Tart | D30/130 |
| 5,127,368 A | | 7/1992 | Akins | |
| 5,738,037 A | * | 4/1998 | Mahan | 119/72 |

* cited by examiner

Primary Examiner—Charles T. Jordan
Assistant Examiner—Yvonne R. Abbott
(74) Attorney, Agent, or Firm—Charles G. Lamb, Middleton & Reutlinger

(57) ABSTRACT

The invention provides a feed saving method of feeding livestock, as well as a feed saving feeder therefore. The animal must pass its mouth over an inwardly and downwardly sloping feed catching portion, then down through a separating portion before obtaining feed contained in a feed containing portion. Excess feed dropping from the animal's mouth onto the feed catching portion slides down into the feed containing portion.

14 Claims, 2 Drawing Sheets

LIVESTOCK FEEDER

This invention deals with the field of livestock feeding and in particular with a novel method of feeding hay or other feed to livestock such as horses, elk, cattle, llamas and so forth, and a feeder for accomplishing the disclosed method.

BACKGROUND

A major problem for livestock producers is that considerable feed is wasted because of the way animals eat. Animals reach into a feeder and pull out hay in their mouths, some of which drops to the ground outside the feeder where it is trampled and lost.

The problem has been addressed in prior art feeders as for example in U.S. Pat. No. 5,127,368 to the present inventor, Akins. In that device, the animals head, when obtaining feed, is well inside the outer walls of the feeder, so that dropped hay falls inside the feeder. The effect is similar in U.S. Pat. No. 4,706,609 to Delichte.

These feeders and other such feeders as are presently known provide a horizontal separation between the feed and animal, however it is not known to provide an initial vertical separation between the feed and animal in addition to, or in combination with the horizontal separation. Some vertical separation results in prior art feeders when the bale or other feed is almost used up, as the animal then must reach down over a skirt on the exterior circumference of the feeder to access the feed. At that point, however, there is no horizontal separation, as the spilled feed is separated from the animal only by a vertical wall.

It is not known in present feeders to direct feed falling from an animal's mouth back into the original feed location that is horizontally separated from the animal. Such feed presently falls into the space between the original feed location and the outer skirt. Feed accumulates in this area where the animal has free access thereto with no horizontal separation. The animal pulls this feed outside the skirt to eat, where dropped feed falls to the ground and is wasted.

Separating the feed vertically as well as horizontally, and providing means to direct dropped feed back into the original, horizontally separated location, would be advantageous in reducing feed waste.

Feeders such as the Akins and Delichte devices are large, expensive and not readily portable by hand. They are generally not well suited to feeding two or three animals, where smaller bales, or even loose hay, might be the preferred feed.

Where a small feeder is desired, there are presently available only troughs or tubs, often made by turning large tires inside out. Hay is placed inside the tub and animals reach over the top and pull the hay out to eat. Much hay is wasted as it drops to the ground from the animals mouth, as there is no horizontal separation of the animal and feed.

Particularly with horses, owners are concerned about injuries. When feeding, horses can be injured by bumping their front legs, particularly knees, against the vertical sides of a feeder.

Many prior art feeders also have a horizontal rail under which the animal must reach to feed, thereby keeping the animal from raising its head and pulling feed outside the feeder. Slanted side rails serve a similar purpose. Animals naturally try to raise their heads when eating, and so rub their necks on these devices, which can cause injury over time.

Small feeders are often moved short distances, for example from pen to pen. Present small feeders, such as those made from tires, are heavy and difficult to move.

SUMMARY OF THE INVENTION

It is an object of the present invention to provide a method of feeding livestock that reduces waste of feed. It is a further object of the present invention to provide such a method that reduces injury to livestock.

It is a further object of the present invention to provide a feeder that reduces waste of feed. It is a further object of the present invention to provide such a feeder that reduces injury to livestock. It is a further object of the present invention to provide such a feeder that is easy to move short distances.

The invention accomplishes these objects providing a feed saving method of feeding livestock comprising containing feed in a container; horizontally and vertically separating said feed from the animal to be fed, thereby forcing said animal to reach its mouth over the horizontal separation and down the vertical separation to obtain said feed; catching feed dropped from said animal's mouth and directing said dropped feed back into said container.

In order to reduce injury to the legs of feeding animals, the method could comprise the further step of preventing the knees of a feeding animal from contacting the feed container or separation means.

The invention also provides a feed saving livestock feeder comprising a feed containing portion; a separating portion recessed inwards from the outer periphery of said feed containing portion, and extending upwards from said feed containing portion; and a feed catching portion sloping upwards and outwards from the top of said separating portion; wherein said animal must pass its mouth over said feed catching portion, then down through said separating portion before obtaining feed contained in said feed containing portion and whereby feed dropping from said animal's mouth onto said feed catching portion slides down into said feed containing portion.

The feed is thus horizontally and vertically removed from the feeding animal which must reach across the horizontal width of the feed catching portion and down the vertical height of the feed catching and separating portions before obtaining food from the feed containing portion. As the animal lifts its head to eat, falling feed drops onto the feed catching portion and slides down the slope thereof back into the feed containing portion.

Proper proportioning of the three portions will allow the feeder to be effective for various sizes of animals. For many animals, the proper separation of animal and feed will be maintained by having the outer periphery of the feed containing portion correspond substantially with the outer periphery of the outer edge of the feed catching portion. When the animal stands with its feet next to the side of the feed containing portion, the outer edge of the feed catching portion will be under its neck, with its mouth positioned over the feed catching portion.

Various slope angles for the feed catching portion will work as all that is required is that the feed slide down the slope into the feed catching portion. It is contemplated that for most animals and feeds, an angle between thirty and sixty degrees will provide the right combination of slope and horizontal/vertical separation.

The feeder accomplishes the feed saving purpose without restricting the animal's head, and without anything on which the animals neck would rub. It is the separation of the animal and the feed combined with the sloped feed catching portion that provides the feed saving feature, rather than any unnatural confining of the animal's movement. To further reduce animal injury the recessed separating portion could coincide with the knees of the animal when the animal's feet are adjacent to the feed containing portion. As the knees are particularly susceptible to injury, such positioning of the recess would allow the animal to lift its feet normally while standing in a feeding position adjacent the feeder, with the knees allowed to enter the recess and so preventing contact with the feeder and possible injury.

The feed containing portion and the outer edge of the feed catching portion could have a circular periphery, rectangular periphery or some polyhedron or oval shape, and could be different. It is contemplated that the most useful embodiment will have the periphery of each substantially the same, and substantially vertically coincidental.

An advantage of a circular or oval periphery is that there are no sharp corners that would increase the possibility of injury to animals. Such a periphery would also provide the same horizontal separation at all points around the feeder. A further advantage of the circular periphery is that the feeder could be tilted up on edge and rolled to a different location.

In a first preferred embodiment the invention provides a feeder wherein said feed containing portion comprises a hollow lower cylinder having an open top and a top flange extending radially inwards from the top edge of said lower cylinder; said separating portion comprises a middle cylinder having an open top and bottom, and having a diameter less than the diameter of said lower cylinder, the bottom of said middle cylinder attached to the inner edge of said flange such as to be substantially concentric with said lower cylinder; and said feed catching portion comprises a catch lip sloping outward and upward from the upper edge of said middle cylinder, the upper edge of said catch lip having a diameter substantially equal to the diameter of said lower cylinder and substantially concentric with said lower cylinder.

A second alternate embodiment provides a feed saving livestock feeder comprising a feed containing portion comprising a hollow lower cylinder having an open top and a top flange extending radially inwards from the top edge of said lower cylinder; a combined separating and feed catching portion comprising a catch lip sloping outward and upward from the inner edge of said top flange, the upper edge of said catch lip having a diameter substantially equal to the diameter of said lower cylinder and substantially concentric with said lower cylinder.

The first preferred embodiment with a distinct short middle cylinder is preferred over the second alternate embodiment because it provides more room for the animals knees. In the second alternate embodiment the slope of the catch lip will be steeper, however sufficient slope to direct feed into the lower cylinder is available in the first preferred embodiment.

A third alternate embodiment provides a feed saving livestock feeder comprising a combined feed containing and vertical separating portion comprising a hollow inner cylinder having an open top; a feed catching portion comprising a catch lip sloping outward and upward from the top edge of said cylinder; and a horizontal separating portion comprising an outer cylinder having a diameter substantially equal to the diameter of the upper edge of said feed catching portion, said outer cylinder attached to the inner cylinder such that said inner and outer cylinders are concentric and the top edge of said outer cylinder is at a midpoint of said inner cylinder.

It is convenient to use the feed containing portion to separate the animal's feet from the feed at substantially the same distance as the upper edge of the feed catching portion, as in the first and second embodiments, however it is not necessary. As illustrated in the third embodiment, a separate cylinder could be added to the outside of the bottom of the feed containing inner cylinder to serve this purpose.

The bottom of the feed containing cylinder, which rests on the ground, could be open or closed, depending on the conditions wherein it will be used. A closed bottom will provide a closed container where the feed is not in contact with the ground, however it will more easily be pushed around by the animal, and rain water will collect therein. An open bottom will allow water to drain away, and ease cleaning old feed out of the feeder by simply tipping and rolling the feeder away. A flange extending radially inward from the bottom of the cylinder would act as a base and prevent the feeder from sinking into wet ground.

The sidewalls of the lower cylinder could curve into the top flange, thereby providing a rounded corner for the purpose of reducing injury to animals feeding from the feeder.

The catch lip could slope outward and upward at an angle between thirty and sixty degrees.

For economy and portability the feeder could be made from molded polyethylene material, resulting in a strong, lightweight feeder. This polyethylene material will also give when animals bump into it, thereby further reducing injuries.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE EMBODIMENT

Figure 1:
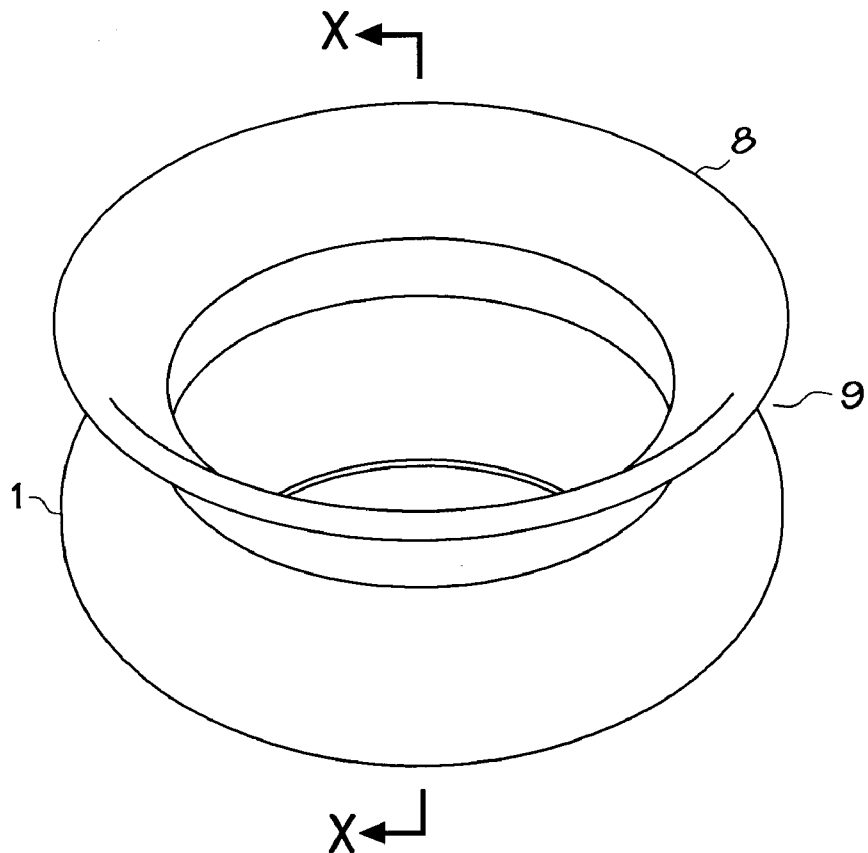
FIG. 1 is a perspective view of the preferred embodiment.
Figure 2:
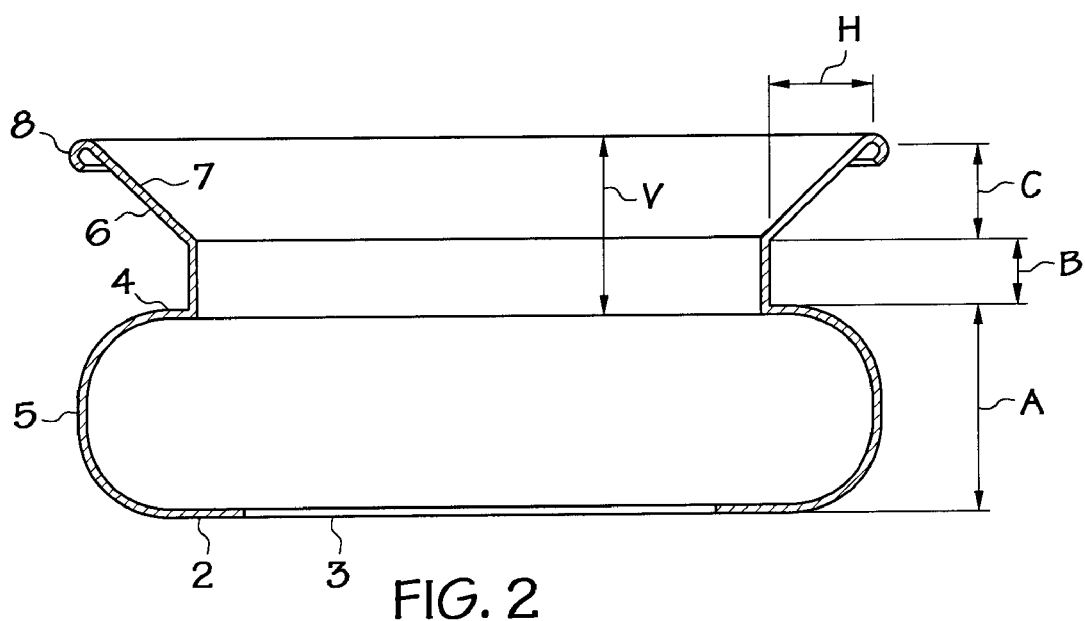
FIG. 2 is a cross-sectional view along XX in FIG. 1.

FIGS. 1 and 2 show a preferred embodiment of the invention, being a feeder with a circular periphery which provides minimum areas which might cause injury, and is also easily moved by tilting on to its edge and rolling.

The feed containing portion A is provided by the lower cylinder 1. Bottom flange 2 extends radially inwards from the bottom of the lower cylinder and acts as a base for the feeder. The bottom 3 of the lower cylinder 1 is thus open to allow water to drain out and facilitate cleaning out old feed. Top flange 4 extends radially inwards from the top of the lower cylinder. The lower cylinder sidewall 5 curves into the top flange 4, making a rounded corner which will reduce injury to feeding animals. The lower cylinder sidewall 5 also curves into the bottom flange 2 for convenience of manufacture.

The separating portion B is provided by middle cylinder 6 attached at its bottom edge to the inner edge of the top flange 4.

The feed catching portion is provided by the catch lip 7, a truncated conical member attached at its bottom edge to the top edge of the middle cylinder 6, and extending upwards and outwards to the top edge 8 of the catch lip 7, which top edge 8 is vertically coincidental with the lower cylinder sidewall 5. The inner surface of the catch lip 7 slopes at an angle of 45 degrees, sufficient that most types of feed will slide down the surface and back into the lower cylinder 1.

The middle cylinder 6 and the top edge 8 of the catch lip 7 are concentric with the lower cylinder 1, thereby maintaining the same horizontal separation H of the feed and animal at all points around the feeder. The vertical separation V of the feed and animal is provided by the middle cylinder 6 and the upward slope of the catch lip 7.

A square sided member could conceivably be substituted for the middle cylinder 6, and provide the advantages described for the circular feeder. The middle cylinder is preferred primarily because of ease of manufacture.

Feed is placed into the feeder to the top of the lower cylinder 1. To obtain feed, the animal extends its mouth across the horizontal separation H, as provided by the outward slope of the catch lip 7 and down through the vertical separation V provided by the vertical slope of the catch lip 7 and the middle cylinder 6. When withdrawing feed from the lower cylinder 1, some feed generally falls from the animals mouth. This dropped feed will fall back into the lower cylinder 1, either directly or by sliding down the catch lip 7 so long as the animals mouth is over the feeder. The animal will normally stand with its feet adjacent the lower cylinder sidewall 5, in which position its mouth will normally be over the feeder. Only when the animal moves its feet away from the feeder will feed fall to the ground and be lost.

The recess 9 on the exterior of the feeder is located in the same area as the animal's knees, allowing the animal to raise its feet without having the knees contact the feeder. As well, the embodiment could economically be made from moulded polyethylene material, which will give somewhat when bumped by an animal, cushioning the shock and further reducing injuries.

Figure 3:
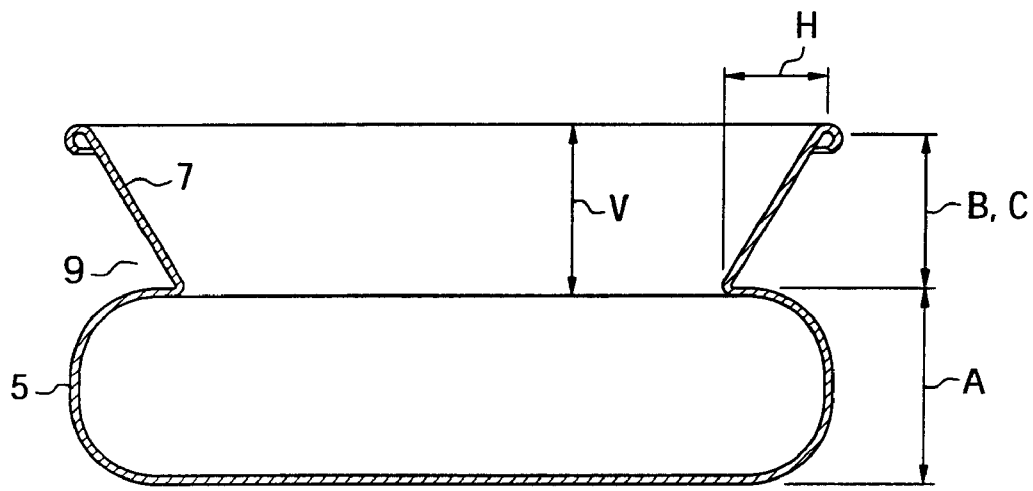
FIG. 3 is a cross-sectional side view of one alternate embodiment.

FIG. 3 illustrates an alternate embodiment wherein the separating portion and feed catching portion are combined into a catch lip 7 with a somewhat steeper slope than that of the embodiment of FIGS. 1 and 2. This embodiment simply eliminates the middle cylinder 6, and the catch lip 7 slopes upward and outward from the inner edge of the top flange 4. The horizontal separation H and vertical separation V are the same as in the embodiment of FIGS. 1 and 2, however the size of the recess 9 is smaller and provides less room for the animal's knees.

Figure 4:
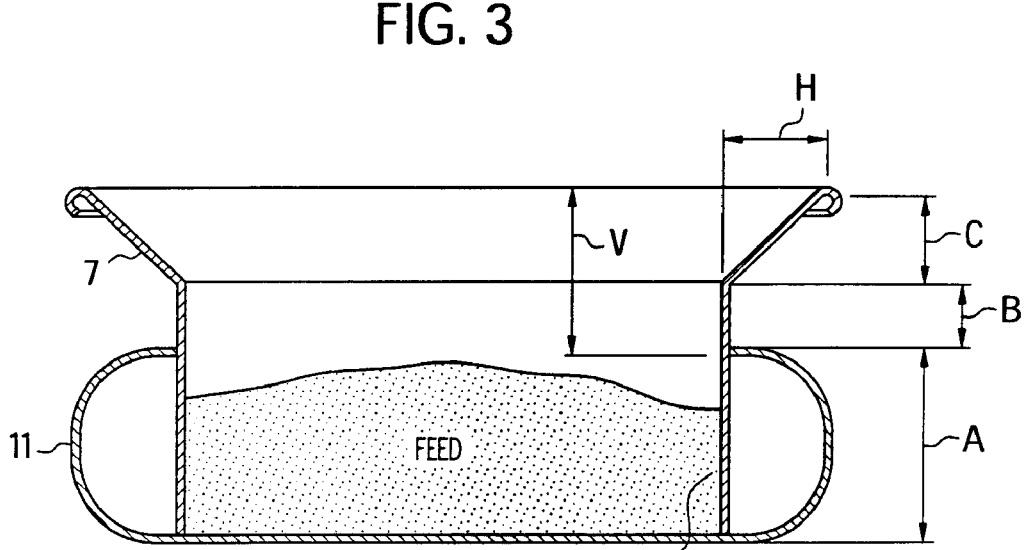
FIG. 4 is a cross-sectional side view of a second alternate embodiment.

FIG. 4 illustrates a second alternate embodiment wherein an inner cylinder 10 provides a combined feed containing and vertically separating portion, and a catch lip 7 provides the feed catching portion. A horizontal separating portion is provided by an outer cylinder 11 which is attached concentrically about a lower portion of the inner cylinder 10. This embodiment provides a feeder which has the same outside dimensions and appearance as the embodiment of FIGS. 1 and 2. The feeder is filled to the level of the top of the outer cylinder 11, and the feeder operates then to save feed in the same manner as the embodiment of FIGS. 1 and 2, however the feed capacity is reduced.

Figure 5:
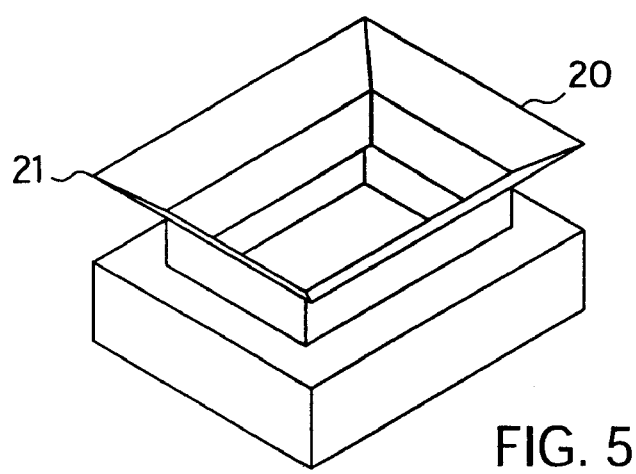
FIG. 5 is a perspective view of an embodiment with a rectangular periphery.

FIG. 5 illustrates an embodiment of the invention that is a feeder with a rectangular periphery 20. As can be seen the rectangular feeder 20 provides horizontal and vertical separation of the feed and animal, although the horizontal separation is not constant around the periphery because of the corners 21. These corners 21 also provide a possible source of injury to feeding animals. This rectangular feeder, as well as other shapes of feeders could however prove useful for feed saving purposes where reducing injury is not a major concern.

The feeder of the present invention could be made of moulded polyethylene, metal, as well as other materials which will be obvious to one skilled in the art, and it will be understood that any such material is contemplated within the scope of the present invention.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

We claim:

1. A feed saving livestock feeder comprising:
 a feed containing portion;
 a separating portion recessed inwards from an outer periphery of said feed containing portion, and extending upwards from said feed containing portion;
 a feed catching portion sloping upwards and outwards, at a slope sufficiently steep that feed falling on the feed catching portion falls down the slope, from the top of said separating portion to an outer periphery of a top end of said feeder;
 wherein an animal must pass its mouth over said feed catching portion, then down through said separating portion before obtaining feed contained in said feed containing portion, and whereby feed dropping from said animal's mouth onto said feed catching portion slides down into said feed containing portion;
 wherein the outer edge of said feed catching portion is substantially in vertical alignment with the outer periphery of said feed containing portion; and,
 wherein said recessed separating portion substantially coincides with knees of said animal when said animal's feet are on the ground adjacent to said feed containing portion which is also resting on the ground.

2. The invention of claim 1 wherein said feed containing portion and said outer edge of the feed catching portion have a circular periphery.

3. The invention of claim 2 wherein:
 said feed containing portion comprises a hollow lower cylinder having an open top and a top flange extending radially inwards from a top edge of said lower cylinder;
 said separating portion comprises a middle cylinder having an open top and bottom, and having a diameter less than the diameter of said lower cylinder, the bottom of said middle cylinder attached to an inner edge of said flange such as to be substantially concentric with said lower cylinder; and,
 said feed catching portion comprises a catch lip sloping outward and upward from the upper edge of said middle cylinder, the upper edge of said catch lip having a diameter substantially equal to a diameter of said lower cylinder and substantially concentric with said lower cylinder.

4. The invention of claim 3 wherein said lower cylinder has a closed bottom.

5. The invention of claim 3 wherein said lower cylinder has an open bottom with a bottom flange extending radially inwards from a bottom edge of said lower cylinder.

6. The invention of claim 5 wherein sidewalls of said lower cylinder curve into said top flange, thereby providing a rounded corner for the purpose of reducing injury to animals feeding from the feeder.

7. The invention of claim 6 wherein said catch lip slopes outward and upward at an angle of between thirty and sixty degrees.

8. The invention of claim 7 wherein said feeder is made from moulded polyethylene material.

9. The invention of claim 1 wherein said feed containing portion and said outer edge of the feed catching portion have a rectangular periphery.

10. A feed saving livestock feeder comprising:
 a feed containing portion comprising a hollow lower cylinder having an open top and a top flange extending radially inwards from a top edge of said lower cylinder;
 a combined separating and feed catching portion comprising a catch lip sloping outward and upward from an inner edge of said top flange to an outer periphery of a top end of said feed saving livestock feeder, an upper edge of said catch lip having a diameter substantially equal to a diameter of said lower cylinder and substantially concentric with said lower cylinder.

11. The invention of claim 10 wherein said lower cylinder has an open bottom with a bottom flange extending radially inwards from the bottom edge of said lower cylinder.

12. The invention of claim 11 wherein the sidewalls of said lower cylinder curve into said top flange, thereby providing a rounded corner for the purpose of reducing injury to animals feeding from the feeder.

13. The invention of claim 12 wherein said catch lip slopes outward and upward at an angle of between thirty and sixty degrees.

14. The invention of claim 13 wherein said feeder is made from moulded polyethylene material.

\* \* \* \* \*